G. E. SIVERLING.
ODONTOMETER.
APPLICATION FILED OCT. 25, 1909.

984,040.

Patented Feb. 14, 1911.

Witnesses:
Ira D. Perry
Jno. H. Nelson Jr.

Inventor:
George Earl Siverling
By H. Sanders
Atty.

UNITED STATES PATENT OFFICE.

GEORGE EARL SIVERLING, OF CHICAGO, ILLINOIS.

ODONTOMETER.

984,040. Specification of Letters Patent. Patented Feb. 14, 1911.

Application filed October 25, 1909. Serial No. 524,309.

*To all whom it may concern:*

Be it known that I, GEORGE EARL SIVERLING, a citizen of the United States, and a resident of Chicago, in the county of Cook and State of Illinois, have invented a new and useful Improvement in Odontometers, of which the following is a full, clear, and exact description.

This invention consists of an odontometer or an instrument for measuring the exact size of a tooth to determine the size of a crown that may be required.

Another object is the creation of a device of the kind that makes possible the production of an exact and definitely marked loop which may be detached from the device and opened out without destroying the impressions made upon the measuring material which indicate the circumferential topography of the tooth.

A still further object is the production of an instrument of the kind that requires the use of but one hand for its operation.

My invention further comprises means for measuring the tooth without twisting the measuring wire upon itself as is now necessary with instruments for a similar purpose already upon the market and to this last named feature I attribute my ability to take the exact size of a tooth with my instrument as the twist given the measuring wire by the instruments now in vogue throws the loop at the end of the wire out of the horizontal plane in which it must necessarily lie about the tooth to get the exact size of, and relatively accurate impressions from, the same.

With this and other objects in view my invention consists in the construction and combination of parts to be described in the following specification, pointed out in the claim and illustrated in the accompanying drawings which form a part of said specification and in which—

Figure 1:
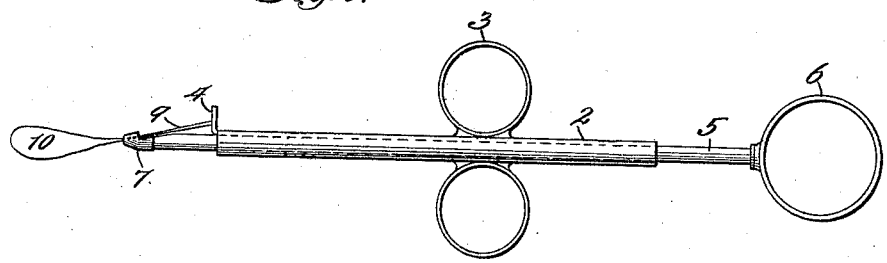
Figure 2:
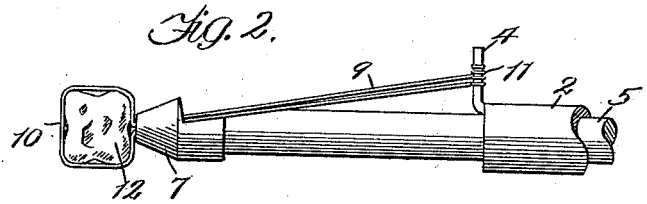
Figure 3:
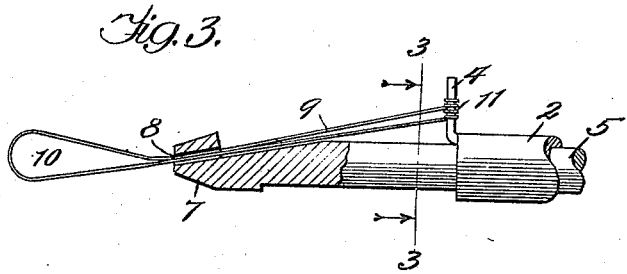
Figure 4:
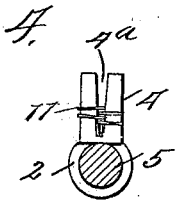

Figure 1 is a side elevation of my device complete. Fig. 2 is a similar view of the invention with a portion of the device broken away and showing the measuring wire engaging a tooth. Fig. 3 is a broken side elevation partly in section. Fig. 4 is a cross section of Fig. 3 on line 3—3.

Similar reference characters indicate corresponding parts throughout the several views.

Referring to the drawings, the numeral 2 designates a casing provided with lateral handles 3 and a lug 4 at one extremity; said lug having a V-shaped opening 4ª therein.

5 is a sliding rod arranged within the casing 2 and extending beyond either extremity of said casing and provided with a handle 6 on one extremity and a head 7 with a guide 8 therein at the opposite extremity.

9 designates my measuring wire which consists of a piece of wire bent to form a loop 10 and then passing through the guide 8 to the lug 4 about which the free extremities of the wire are wound as at 11.

My device may be operated with one hand as no twisting of the casing upon the inner rod is necessary. The loop 10 is simply placed about the periphery of the tooth and the inner rod then pushed through the casing toward the tooth 12 as shown in Fig. 2 until its exact shape and size is obtained as shown. The rod 5 may then be gently moved away from the tooth and the loop slipped off the same. During this operation the loop may be kept in a horizontal position so that it can get an exact measurement of the tooth and receive relatively accurate impressions therefrom which would not be possible with an instrument that winds the wire upon itself.

Having fully described my invention what I claim is:

In a device of the class described, an outer casing having lateral handles secured thereto, an inner member having a guide in one extremity slidably arranged within said outer casing and a handle arranged on its opposite extremity, a piece of loop-forming material adapted for passage through said guide and a lug having an opening therein carried by said outer casing for securing the open extremity of said loop-forming material.

In testimony that I claim the foregoing as my own I have hereto affixed my signature in the presence of two witnesses.

GEORGE EARL SIVERLING.

Witnesses:
MILO F. LEWIS,
EDNA C. CONWAY.